United States Patent
Schubert et al.

(10) Patent No.: US 9,999,230 B2
(45) Date of Patent: Jun. 19, 2018

(54) METHOD FOR PRODUCING A BAKED ARTICLE WHICH IS ASSEMBLED IN THE MANNER OF A SANDWICH, AND ALSO BAKED ARTICLE COMPRISING TWO BAKED PRODUCT PARTS OF SUBSTANTIALLY PLATE-LIKE DESIGN AND A FILLING LAYER ARRANGED BETWEEN THE TWO BAKED PRODUCT PARTS

(71) Applicant: Griesson—de Beukelaer GmbH & Co. KG, Polch (DE)

(72) Inventors: Anton Schubert, Bendorf (DE); Lena Otten, Koblenz (DE); Daniel Sprinz-Vogt, Brodenbach (DE); Juergen Fabian, Dieblich (DE)

(73) Assignee: Griesson—de Beukelaer GmbH & Co. KG, Polch (DE)

( * ) Notice: Subject to any disclaimer, the term of this patent is extended or adjusted under 35 U.S.C. 154(b) by 0 days. days.

(21) Appl. No.: 14/337,757

(22) Filed: Jul. 22, 2014

(65) Prior Publication Data

US 2015/0024090 A1    Jan. 22, 2015

(30) Foreign Application Priority Data

Jul. 22, 2013   (EP) .................................... 13177466

(51) Int. Cl.
*A21D 13/32*   (2017.01)
*A21C 15/02*   (2006.01)
*A21D 13/00*   (2017.01)

(52) U.S. Cl.
CPC .......... *A21D 13/0064* (2013.01); *A21C 15/02* (2013.01); *A21D 13/32* (2017.01)

(58) Field of Classification Search
CPC ............ A21D 13/0064; A21D 13/0025; A21D 13/34; A21C 15/02; A21C 15/007
See application file for complete search history.

(56) References Cited

U.S. PATENT DOCUMENTS 1,869,464 A * 8/1932 Clark ....................... A23G 9/44
                                                        426/95
2,060,490 A    11/1936 Borbely
(Continued)

FOREIGN PATENT DOCUMENTS

EP    0057458 A2    8/1982
EP    0906726 A2    4/1999
(Continued)

OTHER PUBLICATIONS

KarensCookies "Cookie Decorating with Cookie Stencils" https://www.youtube.com/watch?v=HukeTY4K6M4#t=148, published online Nov. 12, 2010.*

(Continued)

*Primary Examiner* — Michele L Jacobson
(74) *Attorney, Agent, or Firm* — Berenato & White, LLC

(57) ABSTRACT

The invention relates to a method for producing a baked article which is assembled in the manner of a sandwich and has two baked product parts which are of substantially plate-like design and have in each case an inner face and an outer face, and a filling layer arranged between the two baked product parts. Furthermore, the invention relates to a baked article, comprising two baked product parts which are of substantially plate-like design and have in each case an inner face and an outer face, and a filling layer arranged between the two baked product parts.

7 Claims, 4 Drawing Sheets

(56) References Cited

U.S. PATENT DOCUMENTS

| | | | | |
|---|---|---|---|---|
| 3,769,035 | A | * | 10/1973 | Kleiner .............. A21D 13/0025 |
| | | | | 426/244 |
| 5,731,020 | A | | 3/1998 | Russo |
| 6,152,302 | A | | 11/2000 | Miller |
| 7,582,321 | B2 | * | 9/2009 | Mihalos ................. A21D 13/32 |
| | | | | 426/275 |
| 2013/0206767 | A1 | | 8/2013 | Cannon, III et al. |

FOREIGN PATENT DOCUMENTS

| | | |
|---|---|---|
| FR | 2535680 A1 | 5/1984 |
| GB | 2048756 A | 12/1980 |

OTHER PUBLICATIONS

Pim, http://chezpim.com/bake/chocolatecaramel-shortbread-sandwiches, published online Jan. 22, 2009.*
Better Homes and Garden Cookies, 1992, p. 70.

* cited by examiner

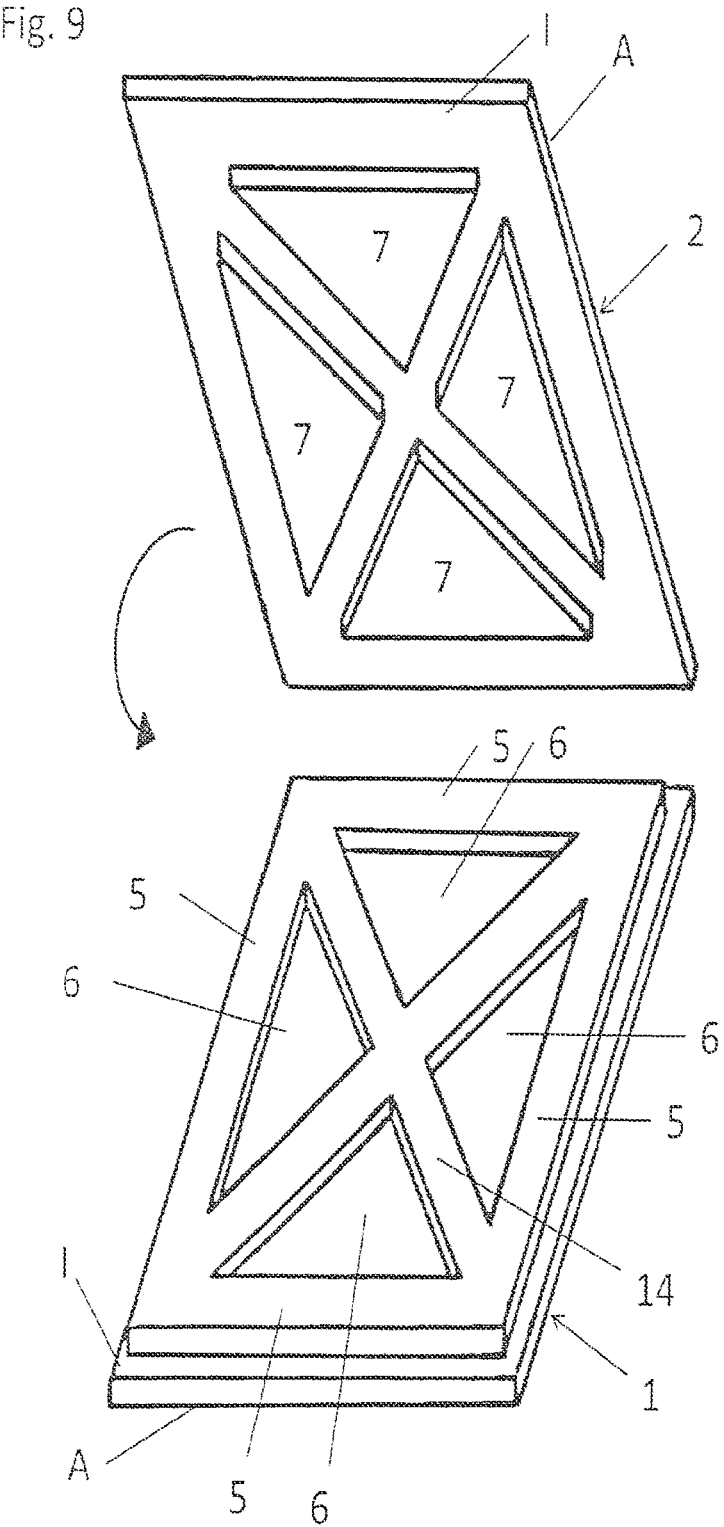

METHOD FOR PRODUCING A BAKED ARTICLE WHICH IS ASSEMBLED IN THE MANNER OF A SANDWICH, AND ALSO BAKED ARTICLE COMPRISING TWO BAKED PRODUCT PARTS OF SUBSTANTIALLY PLATE-LIKE DESIGN AND A FILLING LAYER ARRANGED BETWEEN THE TWO BAKED PRODUCT PARTS

CROSS-REFERENCE TO RELATED APPLICATIONS AND CLAIM TO PRIORITY

This application is related to application number 13177466.3, filed Jul. 22, 2013, in the European Patent Office, the disclosure of which is incorporated herein by reference and to which priority is claimed.

FIELD OF THE INVENTION

The invention relates to a method for producing a baked article which is assembled in the manner of a sandwich and has two baked product parts which are of substantially plate-like design and have in each case an inner face and an outer face, and a filling layer arranged between the two baked product parts.

BACKGROUND OF THE INVENTION

The inner face is understood as meaning that surface of the relevant baked product part which faces the filling layer in the finished baked article, whereas the outer face is that surface which is visible from the outside for the consumer and at which the consumer grips the baked article, for example in order to eat the latter.

Methods in which first of all a filling layer is applied to a first baked product part and, subsequently, a second baked product part is pressed or placed thereon from above, are known in industry. The filling layer is, for example, a chocolate cream. It is disadvantageous that the border of the filling layer of correspondingly produced baked articles has an irregular profile. Also, the distance between the border of the filling layer and the outer border of the baked article may vary.

SUMMARY OF THE INVENTION

It is an object of the invention to avoid the abovementioned disadvantages and to specify a method which permits the production of a baked article with a filling layer, the outer border of which can be designed as desired and which, to this extent, also has the desired external appearance and which is distinguished at the same time by diverse filling options.

This object is achieved in that
either the first baked product part is provided with a filling layer by the inner face of the first baked product part being provided with at least one encircling frame composed of a first filling material, preferably in the region of the outer edges of the baked product part, wherein the region surrounded by at least one frame in each case forms a trough-shaped interior space, and a filling composed of a second filling material subsequently being introduced into said interior space, and in that the second baked product part is applied to, and is therefore connected to, the entity consisting of the first baked product part and the filling layer by bringing the inner face of the second baked product part into contact with the frame and/or with the filling, subsequently,
or else first of all the inner face of the first baked product part is provided with at least one encircling frame composed of a first filling material, preferably in the region of the outer edges of the baked product part, wherein the region surrounded by at least one frame in each case forms a trough-shaped interior space, and, furthermore, first of all the inner face of the second baked product part is provided, in at least one region which, when the two baked product parts are joined together in alignment, is located within the projection of the inner face of a frame, with a plate-like region which is composed of a second filling material and, when the two baked product parts are joined together in alignment, is arranged as a filling in the interior space, and, subsequently, the entity consisting of the second baked product part and that/those region/regions of the second filling material which in each case subsequently forms/form the filling/fillings of an interior space is/are connected to the entity consisting of the first baked product part and the frame/frames by bringing the filling into contact with the frame and/or by bringing the filling into contact with the inside of the first baked product part and/or by bringing the inside of the second baked product part into contact with the frame, wherein, in the connected state, that/those region/regions of the second filling material which in each case forms/form the filling of an interior space is/are located in the trough-shaped interior space/interior spaces of the first filling material.

According to the second variant of the method according to the invention, "bringing the filling into contact with the inside of the first baked product part" is understood as meaning not only bringing the filling into contact with the inside of the first baked product part, but also bringing the filling into contact with a possible intermediate layer applied to the first baked product part.

In the case of the method according to the invention in accordance with the second variant, the filling layer comprises at least one frame and the plate-like region/regions which is/are surrounded by the frame/frames and is/are composed of the second filling material, and optionally, furthermore, also an intermediate layer applied to the first baked product part.

"In the region of the outer edge" is understood as meaning an arrangement in which the frame is adjacent to the relevant outer edge directly, in particular is flush with the surface thereof. Of course, an arrangement of the frame at a distance of a few millimetres or centimetres from the respective outer edge of the baked product parts is also possible. The frame may, of course, also be formed protruding on the outside in relation to the baked product parts.

The outer contour of the frame is preferably matched to the shape of the baked article. If the baked product parts are, for example, of square design, the frame is preferably also square. Of course, however, a modified configuration, for example in the form of a round frame in the case of rectangular baked product parts is also possible. The baked article may also contain a plurality of frames arranged next to one another.

A trough-shaped interior space is understood as meaning a region surrounded by a frame. The shape of the trough-shaped interior space and also the number and the configuration of the edges, for example the shape of the edges, can be as desired. The edges can thus have, for example, a sharply formed contour. However, other edges, for example with an irregular profile, are also possible. The contour of the trough-shaped interior space can be selected as desired, for example by means of the configuration of the shape.

In comparison to conventional moulding methods, the method according to the invention affords the advantage that a filled baked article can be produced with an attractive appearance and with clearly defined borders, wherein the number of fillings can be as desired. The type of filling and the structure of the filling can also be freely selected. For example, it is also possible to produce baked articles, the filling of which is composed of a plurality of filling materials, for example a multiplicity of mixtures, and which nevertheless has visually attractive borders to the outside.

The filling can be of any viscosity, density and flow properties. Fillings which differ in their physical properties from those of the frame can also be used. Even glutinous fillings are possible. Of course, fillings in lump form can also be used. Soft fillings become stable by means of the frame. The risk, for example, of cream escaping and of the borders spreading is therefore minimized. The filling volume can be configured individually by changing the frame width and the frame height.

A frame can have a base which is in contact with the inner face of the first baked product part. The base is preferably composed of the same material as the frame. Of course, the base and the frame may also be composed of different materials.

The first baked product part can be provided with an encircling frame and the second baked product part can be provided with a plate-like region composed of a second filling material, wherein a third filling material is provided on the lower side of the region and/or on the upper side of the base of the interior space, i.e. either on the inner face of the first baked product part or on the upper side of the base, said third filling material connecting the two baked product parts to each other by a joining method, in particular by gluing, optionally after passing through a cooling process, when said baked product parts are brought into contact by being joined together in alignment. In such a configuration, in addition to at least one frame and at least one plate-like region which is surrounded by the frame and is composed of the second filling material, the filling layer also comprises the third filling material.

The first filling material forming the frame can be brought into contact when not yet solidified, with the first baked product part, and the first filling material can subsequently solidify in a manner binding the first baked product part thereto. For example, the first filling material forming the frame can be cast into a frame-shaped mould, and, subsequently, a baked product part can be placed onto the first filling material which is not yet in the hardened state and, after the hardening, forms the frame. After the hardening, for example by cooling, the hardened frame is connected to the baked product part. Alternatively, the first filling material forming the frame can be cast onto a baked product part, wherein a suitable mould device enabling the casting of a frame is arranged preferably in the region of the upper side of the baked product part. Subsequently, the first filling material hardens. If the frame also comprises a base, the latter is preferably cast directly with the frame.

The second baked product part can be applied to the frame which is not yet or is no longer completely solidified, at least in the subsequent contact region with the second baked product part. The frame is therefore not yet completely solidified, i.e. hardened, at least in the contact region. After the hardening, the second baked product part is fixed in relation to the frame. For the fixing, if the frame, for example, has already completely hardened, the face to be brought into connection with the second baked product part can be, for example, slightly heated and, subsequently, the second baked product part can be applied.

The frame can also be premanufactured separately.

The frame can be applied, in particular directly, to the first baked product part by a joining method.

Joining is understood as meaning a method for permanently connecting the frame and the baked product part concerned, such as, for example, pressing in or on, filling, gluing, or the like. For example, the surface of the frame can be locally heated. The surface of the frame can also, for example, have bumps which engage in corresponding recesses in the baked product part.

The second baked product part can be connected to the frame by means of a joining method.

Additives can be used in the joining. An example thereof is liquid chocolate which is cooled after being applied and bringing the regions to be connected into contact.

The additive can correspond to the first filling material forming the frame and/or to the second filling material forming the filling. Of course, the additive can also differ from the first filling material forming the frame and/or from the second filling material forming the filling.

The first filling material forming the frame can be identical to the second filling material forming the filling. Of course, the first filling material and the second filling material can also be different.

The third filling material can be identical to the second filling material forming the filling and/or identical to the first filling material forming the frame. All of the filling materials can thus be identical or different.

In the finished state, a small distance can remain between the frame, on the one hand, and the inner face of one of the two baked product parts, on the other hand, and the two baked product parts can be connected to each other via the filling which is composed of at least one further, hardening filling material, in particular of a hardening second filling material. Such a configuration is illustrated in FIG. 4. In this case, the filling has to be sufficiently high so that a gap is produced. The filling hardens, and therefore the two baked product parts are connected to each other via the filling. The filling is hardened at least to an extent such that said filling maintains an outer configuration induced by the hardening, or, because of its consistency, on shifting out of its induced outer configuration, moves back again into its induced outer configuration. Hardening is also understood as meaning the reaching, for example, of jelly strength.

The surfaces of the two baked product parts can have, at least in the region of the interior space, a moisture-isolating barrier layer for the use of a water-containing filling. The filling can then also be a liquid. A barrier layer used, for example, for use of water-containing fillings, may be, for example, fats/fat glazes, such as, for example, mixtures of palm oil and/or palm nut oil and/or cocoa butter, and/or coating means, such as, for example, shellac, gum Arabic or beeswax, which are applied to the two baked product parts. Of course, other materials are also possible as the barrier layer.

The invention also relates to a baked article, comprising two baked product parts which are of substantially plate-like design and have in each case an inner face and an outer face, and a filling layer arranged between the two baked product parts, in particular produced according to one of the method claims.

Baked articles in which, for example, a chocolate cream has been introduced as the filling layer between two baked product parts, are known in industry. It is disadvantageous that the border of the filling layer of such baked articles has an irregular profile. The distance between the border of the filling layer and the outer border of the baked article may also vary.

It is the object of the invention to avoid the disadvantages mentioned above and to specify a baked article which has a filling layer, the outer border of which can be configured as desired and which, to this extent, also has the desired external appearance and which is distinguished at the same time by diverse filling options.

This object is achieved in that the filling layer, preferably in the region of the outer edges of the baked product parts, comprises at least one encircling frame, which forms an interior space and is composed of a first filling material, and a filling, which is arranged in the interior space and is composed of a second filling material and optionally of at least one further filling material.

The frame can be in contact with the inner faces of the two baked product parts directly and/or indirectly by means of an additive. In the event of being indirectly in contact, an additive or a layer formed in another manner is provided between the frame and the baked product part.

If a plurality of frames are provided, adjacent frames can be arranged at a distance from one another or else in contact with one another. If adjacent frames are in contact with one another, said adjacent frames can also have a common frame section in the form of a web.

The encircling frame can have a base which is in contact with the inner face of the first baked product part. The base is preferably composed of the same material as the frame. Of course, the base and the frame can also be composed of different materials.

In the finished state there can be a small distance between the frame, on the one hand, and the inner face of one of the two baked product parts, on the other hand, and that region of the second filling material which forms the filling of the interior space of the frame can be formed from a hardening material, wherein the filling, for example composed of chocolate, is connected, on the one hand, to the inner face of the baked product part arranged at a distance from the frame and, on the other hand, either to at least one frame face facing the interior space and/or to the inner face of the baked product part not arranged at a distance from the frame and/or to the upper side of the base of the interior space, i.e. to the inner face of the first baked product part or to the upper side of a base.

The first filling material forming the frame and/or the plate-like region composed of the second filling material can be, for example, chocolate, a fat glaze, nougat, a baked article, fondant/sugar mixtures, caramel, cracknel, marzipan, ice-cream, jelly, fruit gum/wine gum, foam sugar, cheese, aspic, meat products or the like. The cheese can be sliced or in the form of processed cheese. Of course, combinations of the abovementioned materials or other filling materials are also possible.

For the filling composed of the second filling material and/or for the third filling material, use can be made of, for example, chocolate or fat glazes or nougat or fatty creams, such as, for example, milk cream, or cream or ganache, or water-based mixtures, such as, for example, fondant/decorative sugar mixtures, or sauces, such as, for example, chocolate sauce, caramel sauce or the like, or baked articles or sugar solutions, such as, for example, sugar-crusted chocolate fillings, or caramel or cracknel, or pudding-like mixtures, or marzipan or ice-cream or jelly or fruit mixtures or fruit gum/wine gum or foam sugar or cheese (sliced or processed cheese) or cheese cream or salmon cream or aspic or meat products. Of course, combinations of the abovementioned materials or other materials are also possible.

The first filling material forming the frame and/or the filling composed of the second filling material and/or the third filling material and/or the plate-like region composed of the second filling material can also contain solid materials, such as freeze-dried fruit, for example strawberries, or candied orange peel or candied lemon peel or fruit pulp or caramel or cracknel or nuts, such as, for example, hazelnuts, macadamia nuts, or cores of stone fruit, such as, for example, coconuts, almonds, pecan nuts, pistachios or peanuts or cashew nuts, or oil seeds, such as, for example, sunflower seeds, sesame, poppy, or extrudates, such as, for example, rice crispies, wheat pops, cornflakes, or chocolate or sugar beans. Of course, combinations of the abovementioned ingredients or other materials are also possible.

The baked product parts can be composed, for example, of yeast-based doughs. Short crust pastry products, hard biscuits, puff pastries, Danish pastries, waffles, gingerbread, crackers, soda dough products, wafers, rusks, meringues, biscuits, macaroons, Florentines, hazel nut products, bread, dry flat breads or else crisp breads can also be used as the baked product parts. Of course, other baked articles or combinations of various baked articles can also be used.

BRIEF DESCRIPTION OF THE FIGURES

Exemplary embodiments of the invention are explained below and are illustrated in the drawings, in which:

FIG. 9 shows an alternative exemplary embodiment of a baked article.

DETAILED DESCRIPTION OF THE PREFERRED EMBODIMENT(S)

In all of the figures, corresponding reference numbers are used for identical or similar components.

Figure 1:
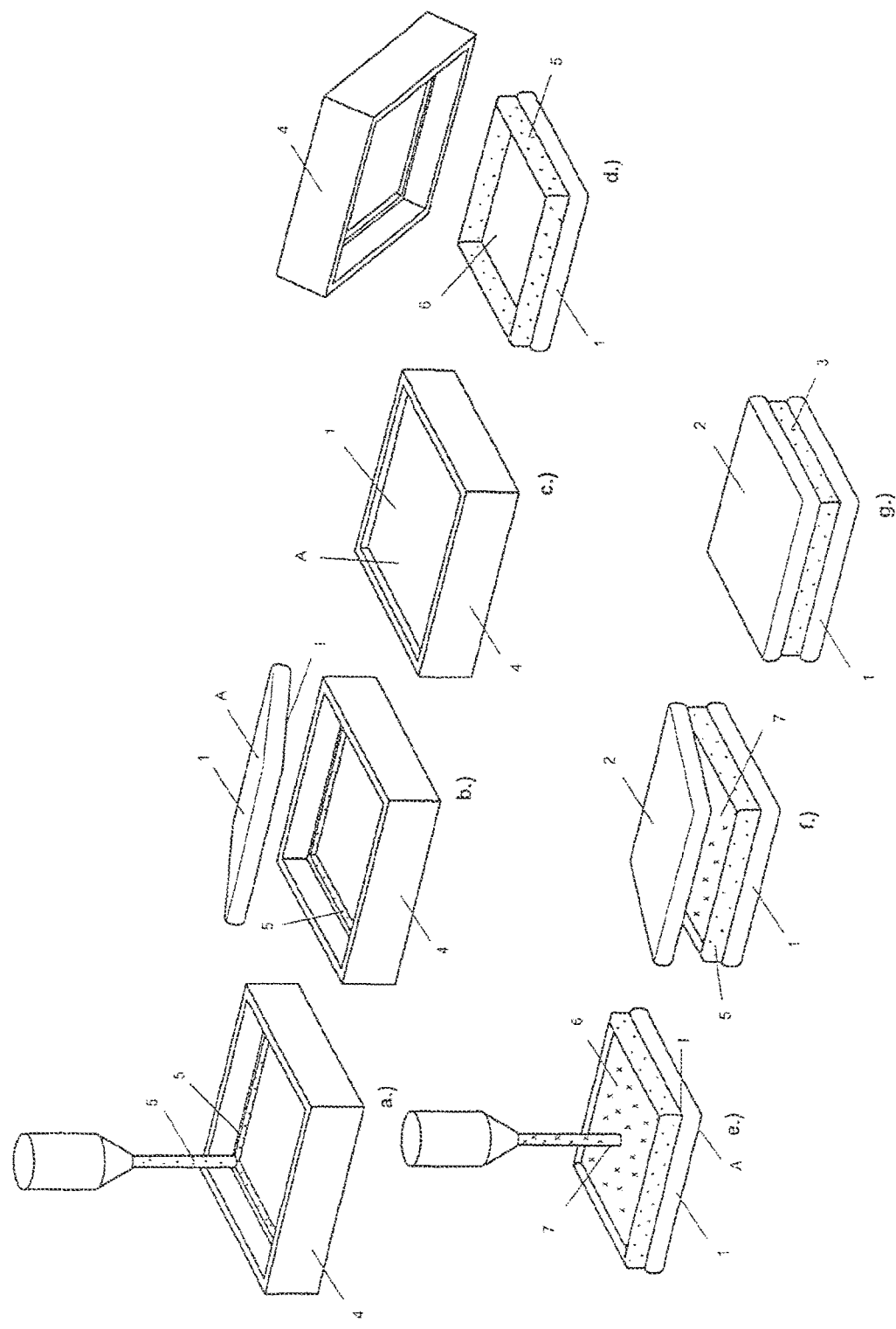
FIGS. 1*a-g* show the sequence of a first variant embodiment of a production method according to the invention.
Figure 2:
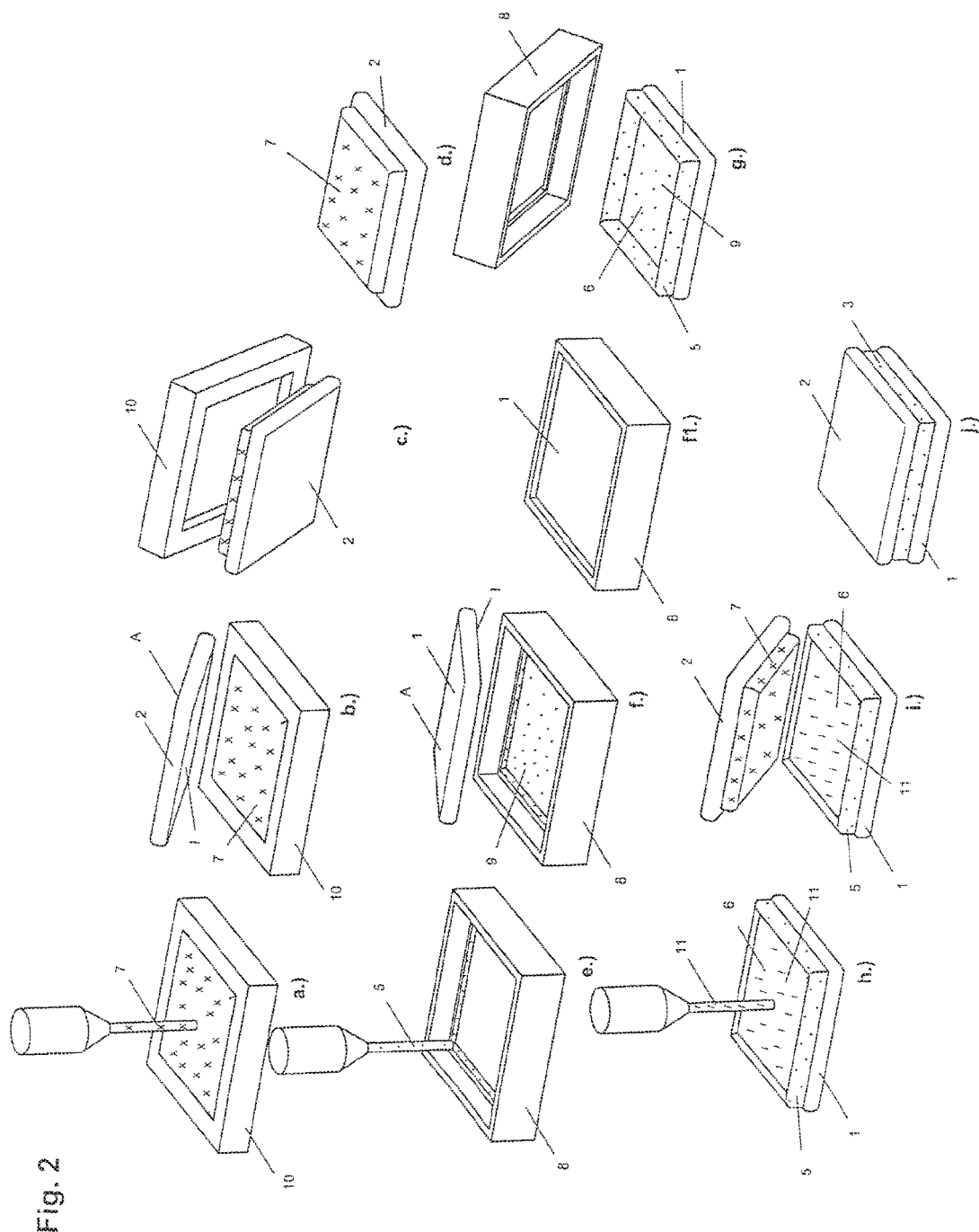
FIGS. 2*a-j* show the sequence of a second variant embodiment of a production method according to the invention.

FIGS. 1 and 2 illustrate sequences of two variant embodiments of the production method according to the invention.

Each baked article comprises two baked products parts 1, 2 which are of substantially plate-like design and have in each case an inner face I and an outer face A, and a filling layer 3 arranged between the two baked product parts 1, 2.

The first variant embodiment of a production method according to the invention is illustrated in FIG. 1. In a first step a), a first filling material 5 is poured into a mould 4, said filling material forming an encircling frame after the subsequent hardening.

A first baked product part 1 is placed onto the first filling material 5, which has not yet hardened, as illustrated in step b). The mould 4 with the first filling material 5, which has not yet hardened, and with the first baked product part 1 placed onto the latter can be transported, optionally via a vibrating table, in order to obtain the correct fit of the baked product part 1 in the mould 4. In this manner, an optimum connection between the first filling material 5 and the first baked product part 1 is produced and a visually attractive product is obtained.

The mould 4 subsequently passes through a cooling process (step c). After the cooling process, the first baked product part 1 is removed from the mould 4 together with the frame, which has then hardened, is composed of the hardened first filling material 5 and forms a trough-shaped interior space 6. This demoulding step is illustrated in step d).

As illustrated in FIG. 1 e), a filling composed of a second filling material 7 is then introduced into the interior space 6 and, according to step f), the second baked product part 2 is applied to the entity consisting of the first baked product part 1 with the frame and the applied filling composed of a second filling material 7. The filling composed of the second filling material 7 has not yet hardened. The baked article is then cooled in step g), and therefore the second filling material 7 hardens and enters into a stable connection with the first baked product part 1, the inner face of the frame and the second baked product part 2.

FIG. 2 shows an alternative variant embodiment of a production method according to the invention. As is illustrated in step e), a first filling material 5 is first of all poured into a mould 8. Said first filling material 5 forms a frame after hardening. In the exemplary embodiment illustrated, the hardened first filling material 5 also forms a base 9, and therefore, to this extent, the frame and the base 9 are composed of the subsequently hardened, first filling material 5. The region surrounded by the frame and the base 9 in turn form a trough-shaped interior space 6. Of course, an embodiment without a base 9 is also conceivable.

In steps f) and f1), the first baked product part 1 is placed onto the first filling material 5 which has not yet hardened. The first filling material subsequently hardens in a cooling step, wherein, after the hardening, the baked product part 1 is demoulded together with the frame and the base 9 in step g).

Furthermore, as is illustrated in step a), a second filling material 7 is poured into another mould 10. The area provided with the second filling material in the mould 10 is selected in respect of the dimensions thereof and arrangement thereof in such a manner that, during the joining together, which is described later, the second filling material 7 is located in that region of the inner face of the first baked product part 1 which, when the two baked product parts 1, 2 are joined together in alignment, is located within the projection of the inner face of the frame.

A second baked product part 2 is placed onto the second filling material 7, which is not yet hardened, as is illustrated in step b). The second filling material 7, which is in contact with the second baked product part 2, is subsequently cooled, and therefore the second filling material 7 hardens and a plate-like region is thereby produced on the second baked product part 2. After the cooling process is finished, the second baked product part 2 with the plate-like region composed of the hardened second filling material 7 is also demoulded, in step c).

A third filling material 11 is subsequently introduced into the interior space 6 formed from the encircling frame and the base 9. This is illustrated in step h). After the third filling material 11 which, for example, has not yet cured is put in, the second baked product part 2 is placed, in step i), onto the first baked product part 1, wherein, in the applied state, the filling, i.e. the plate-like region composed of a second filling material 7, is located in the trough-shaped interior space 6. A cooling process in which the third filling material 11 changes its viscosity, in particular hardens, is subsequently passed through in step j) and the two baked product parts 1, 2 are thereby connected to each other.

FIGS. 3 to 9 illustrate various exemplary embodiments of baked articles according to the invention.

Figure 3:
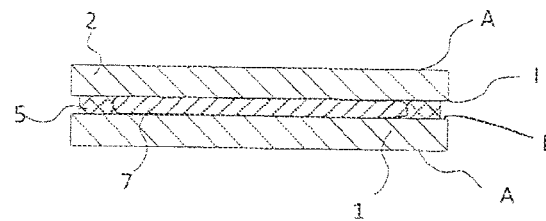
FIG. 3 shows a section through a first exemplary embodiment of a baked article.

In the exemplary embodiment according to FIG. 3, an encircling frame composed of a first filling material 5 is provided in the region of the outer edges of the two baked product parts 1, 2. The frame composed of a first filling material 5 forms an interior space 6 in which the filling composed of a second filling material 7 is arranged.

The frame could have also been connected, for example, to the first baked product part 1 and to the second baked product part 2 by a joining method. However, it is entirely also possible for the frame to be in contact only with the first baked product part 1 and/or with the second baked product part 2, while the actual connection of the two baked product parts 1, 2 takes place by means of the hardened filling, i.e. by means of the second filling material 7, which may be, for example, chocolate.

Figure 4:
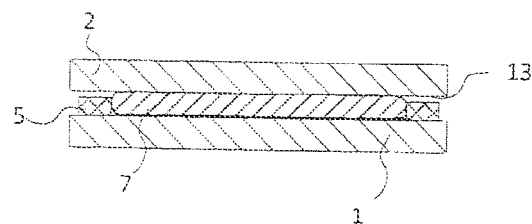
FIG. 4 shows a section through an alternative exemplary embodiment of a baked article.

FIG. 4 illustrates an exemplary embodiment in which there is a small distance 13 between the frame, on the one hand, and the inner face I of the second baked product part 2, on the other hand. In this case, the second filling material 7 forming the filling is composed of a hardening material, wherein the second filling material 7 is connected, on the one hand, to the inner face I of the second baked product part 2 arranged at a distance from the frame and, on the other hand, to the frame face facing the interior space and to the inner face I of the first baked product part 1. If a base 9 is present, the second filling material 7 is connected, on the one hand, to the inner face I of the second baked product part 2 arranged at a distance from the frame and, on the other hand, to the frame face facing the interior space and to the base 9.

Figure 5:
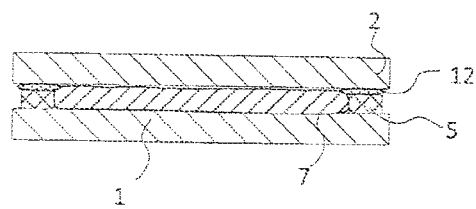
FIG. 5 shows a section through an alternative exemplary embodiment of a baked article.

FIG. 5 illustrates an exemplary embodiment in which, for example, the frame has been cast onto the first baked product part 1 and has hardened thereon. The second filling material 7 forming the filling is then fed into the interior space 6. The second baked product part 2 is fastened by means of a joining method with the use of an additive 12. However, other types of connection are also possible. The additive 12 can correspond, for example, to the first filling material forming the frame. The additive 12 and the second filling material 7 can also be identical. Of course, other materials are also conceivable.

The baked article illustrated in FIG. 5 can also be produced by pressing together the baked article illustrated in FIG. 4 if the second filling material 7 forming the filling has not yet hardened. Since the volume of the second filling material 7 is greater than the volume of the interior space 6, when the two baked product parts 1, 2 are pressed together, the second filling material 7 is pressed laterally outwards into the region between the upper side of the frame and the baked product part 2. In such a case, the additive 12 illustrated between the upper side of the frame and the baked product part 2 is the second filling material 7.

Figure 6:
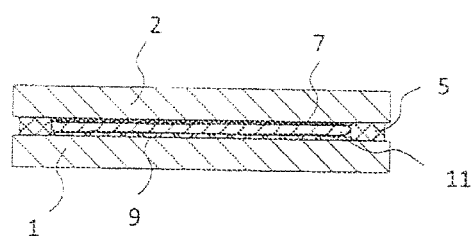
FIG. 6 shows a section through an alternative exemplary embodiment of a baked article.
Figure 7:
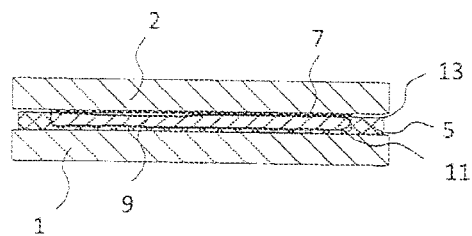
FIG. 7 shows a section through an alternative exemplary embodiment of a baked article.
Figure 8:
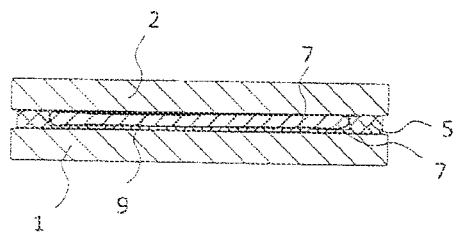
FIG. 8 shows a section through an alternative exemplary embodiment of a baked article.

The exemplary embodiments according to FIGS. 6 to 8 illustrate baked articles in which the frame has a base 9 which is in contact with the inner face I of the first baked product part 1. Of course, the baked articles illustrated in FIGS. 6 to 8 are also conceivable without a base 9.

Whereas, in the case of the exemplary embodiment according to FIG. 6, the frame is in contact directly with the second baked product part 2, there is a small distance 13 therefrom in the embodiment according to FIG. 7. In such a configuration, the two baked product parts 1, 2 are connected to each other via the connection between the filling, which is composed of a hardenable second filling material 7, the base 9 and the third filling material 11. The second filling material 7, for its part, is connected here to the baked product part 2 and the base 9, for its part, is connected to the baked product part 1. In the exemplary embodiment illustrated, the third filling material 11 is connected to the base 9 and to the inner faces of the frame and to the second filling material 7.

FIG. 8 illustrates an exemplary embodiment in which the frame likewise has a base 9 which is in contact with the first baked product part 1. The frame and the base 9 can be, for example, cast on or moulded in. However, they can also have been premanufactured separately and subsequently connected to the first baked product part 1 by a joining method. A second filling material 7 has been introduced as the filling into the interior space 6 formed by the frame and the base 9. A second baked product part 2 has subsequently been applied. The connection between the upper baked product part 2 and the frame can be realized, for example, by a joining method. Of course, it is also possible for, for example, the second filling material 7, while not yet hardened, to have been fed into the interior space 6. After the second baked product part 2 is placed on, the second filling material 7 hardens, for example, by cooling. The baked product part 2 is in contact here with the second filling material 7, which is not yet hardened, and therefore a connection to the second baked product part 2 is thus produced.

FIG. 9 illustrates an exemplary embodiment which, in a fundamental respect, has been produced according to the production method illustrated in FIGS. 2a-j. In contrast to the baked article illustrated in FIGS. 2a-j, in FIG. 9 the first filling material 5 poured into a mould 8 forms a total of four frames after hardening. Each frame has a triangular configuration. In the exemplary embodiment illustrated, two adjacent frames are separated from each other by a common web 14 which lies on the section between two diagonally opposite corners of the baked article.

In accordance therewith, the second filling material 7 is poured into another mould 10 in such a manner that, for example, after the hardening, four faces composed of the second filling material 7 are produced on the second baked product part 2. In the exemplary embodiment illustrated, the faces are likewise of triangular design. The four faces of the second filling material 7 are selected in respect of the dimensions thereof and the arrangement thereof in such a manner that, during the subsequent joining together, said faces engage in the four trough-shaped interior spaces 6 produced on the first baked product part 1 by hardening of the first filling material 5. Otherwise, the production method corresponds to the production method illustrated in FIGS. 2a-j. Of course, an embodiment with a base 9 is also conceivable.

The configuration of each frame can be freely selected. The frames also do not have to be in contact with one another. If a plurality of frames are provided, a different, second filling material 7 forming the face can engage, for example, in each trough-shaped interior space 6. Each frame can therefore contain a different filling by the use, for example, of different second filling materials 7. The frames can also be formed from different materials.

If in particular aqueous solutions are intended to be introduced as fillings, the respective inner face I of the two baked product parts 1, 2 is provided with a barrier layer at least in the region which is in contact with the material in the interior space 6. In particular when aqueous fillings are used, each baked product part 1, 2 is connected to the frame/frames.

The invention claimed is:

1. A method for producing a baked article having a first baked product part and a second baked product part, which are each of substantially plate-like configuration, each of the first and second baked product parts has an inner face and an outer face, and a filling layer is arranged between the two baked product parts, the method consisting essentially of the steps of:
   a) providing a mould;
   b) forming an encircling frame inside the mould;
   c) placing the first baked product part into the mould and onto the encircling frame, such that the encircling frame forms on the inner face of the first baked product part, the encircling frame defining an interior space;
   d) removing the mould after the frame has been formed on the inner face of the first baked product part;
   e) filling the interior space with at least a second filling material; and
   f) positioning the second baked product part on the first filling material and/or the second filling material, so that the first filling material and the second filling material form the filling layer and the first and second baked product parts are joined.

2. The method of claim 1, wherein the encircling frame has a base which is in contact with the inner face of the first baked product part.

3. The method of claim 1, wherein step e) also provides a further filling material which is identical to the second filling material and/or the first filling material.

4. The method of claim 1, wherein step a) and/or step f) occur when the first filling material is not solidified, and thereafter solidifying the first filling material to bind the first and second baked product parts.

5. The method of claim 1, wherein the first filling material is the same as the second filling material.

6. The method of claim 1, wherein, in a finished state, a small distance remains between the frame and the inner face of one of the first and second baked product parts, and the first and second baked product parts are connected to each other via hardening of the second filling material.

7. The method of claim 1, wherein the first filling material is chocolate.

* * * * *